United States Patent
Stein et al.

(10) Patent No.: US 8,767,892 B1
(45) Date of Patent: Jul. 1, 2014

(54) SYNCHRONIZATION SYSTEM FOR A WIRELESS RECEIVER

(71) Applicant: Guzik Technical Enterprises, Mountain View, CA (US)

(72) Inventors: Anatoli B. Stein, Atherton, CA (US); Semen Volfbeyn, Palo Alto, CA (US)

(73) Assignee: Guzik Technical Enterprises, Mountain View, CA (US)

( * ) Notice: Subject to any disclaimer, the term of this patent is extended or adjusted under 35 U.S.C. 154(b) by 0 days.

(21) Appl. No.: 13/910,738

(22) Filed: Jun. 5, 2013

(51) Int. Cl.
*H04L 27/06* (2006.01)

(52) U.S. Cl.
USPC .......... 375/343; 375/140; 375/147; 375/150; 375/152; 375/316; 375/340

(58) Field of Classification Search
CPC .... H04B 1/7093; H04B 1/709; H04B 1/7095; H04B 2001/709; H04B 2001/7093; H04B 2001/70935; H04L 7/04; H04L 7/041; H04L 7/042
USPC .......... 375/140, 147, 150, 152, 316, 340, 343
See application file for complete search history.

(56) References Cited

U.S. PATENT DOCUMENTS

| | | | |
|---|---|---|---|
| 7,379,519 B2 | 5/2008 | Lewis et al. | |
| 7,756,225 B2 | 7/2010 | Fechtel | |
| 2011/0002430 A1* | 1/2011 | Kim et al. | 375/362 |
| 2013/0279448 A1* | 10/2013 | Kim et al. | 370/329 |

* cited by examiner

*Primary Examiner* — Siu Lee
(74) *Attorney, Agent, or Firm* — Burns & Levinson LLP; Joseph M. Maraia

(57) ABSTRACT

A synchronization system for initial setup of phases of local oscillators in a wireless receiver of a communication system characterized by transmission of data packets having a predetermined preamble consisting of M identical sections of L symbols followed by a single section of the same kind, multiplied by −1, and wherein the wireless receiver is operative to perform decimation in an RF demodulator. The synchronization system includes a twofold correlator, an accumulator, a multipler, a threshold comparator, a carrier phase former and a clock phase former, and operates at a decimated symbols frequency, and performs not only preamble detection, but also symbols clock phase detection together with carrier phase detection, while enabling the theoretically possible noise immunity.

6 Claims, 7 Drawing Sheets

Preamble structure

Symbols correlation

Symbols correlation multiplied by -1

Accumulated symbols correlation

Output of multiplier 14

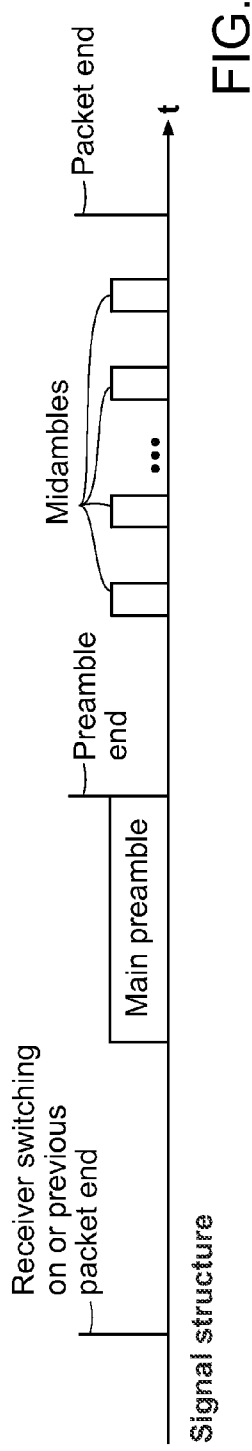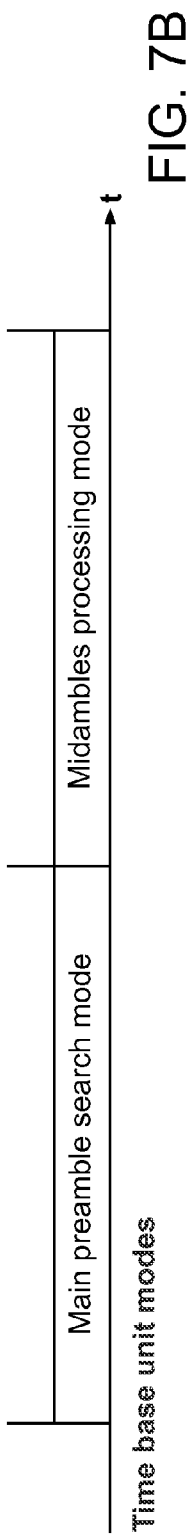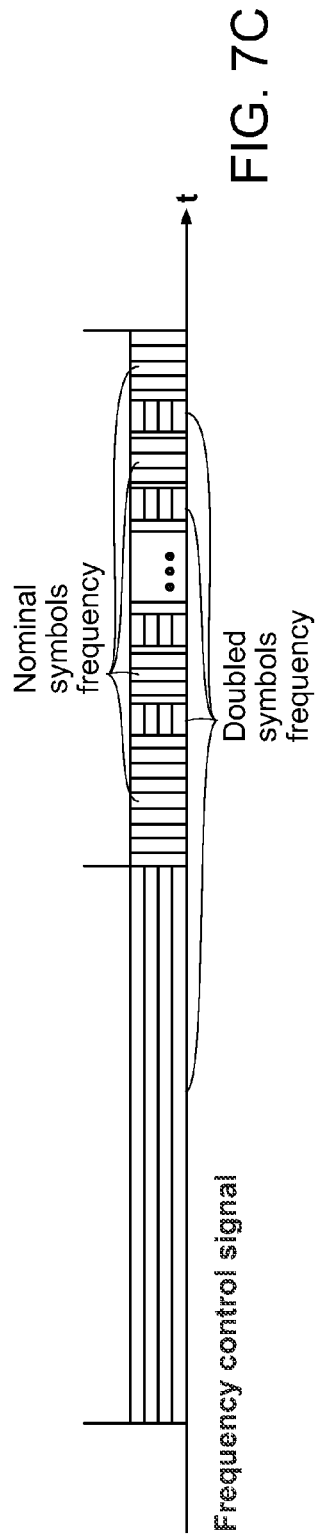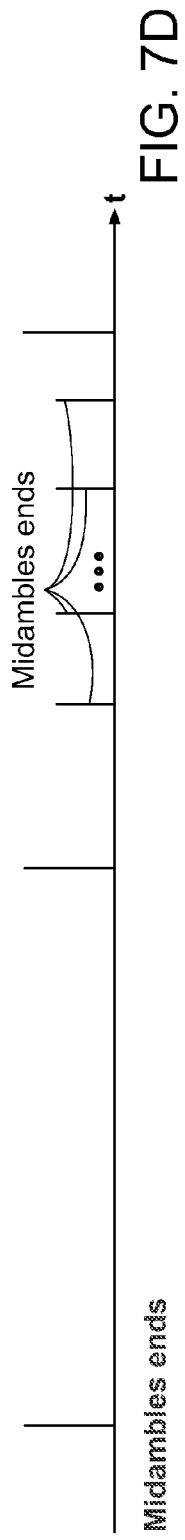

SYNCHRONIZATION SYSTEM FOR A WIRELESS RECEIVER

FIELD

This invention relates to a device for synchronization of a wireless receiver and, in particular, to a device for initial set up of receiver local oscillators.

BACKGROUND

In present-day wireless local area networks, data are transmitted as a sequence of packets, with each packet being preceded by a known preamble to support acquisition at the receiver end. A proper process of data detection requires synchronization of a receiver carrier oscillator and symbols clock oscillator with the corresponding parameters of an incoming signal. Therefore, a first operation of a receiver, along with preamble detection (that is finding of the accurate time position of the preamble and thus the time position of subsequent payload data), includes detection of the carrier phase and symbols timing phase in the received signal as well.

Noise and frequency distortions that affect signal transmission may cause a failure of the preamble detector: a damaged preamble may be not detected (preamble loss) or a burst of noise may be mistaken for a preamble (false preamble) or phases detection may be done with a prohibitive error. Such events violate data transmission, and the probability of their occurrence should be made as small as possible.

The probability of preamble detector failure may be reduced by use of correlation reception concepts, as it is done, for example, in U.S. Pat. No. 7,379,519 and U.S. Pat. No. 7,756,225. In accordance with those patents, correlation between sections of a received signal and sections of a known preamble are calculated, the calculated correlation results are accumulated, and the accumulated values are compared with a predetermined chosen threshold. Surpassing of the accumulated value over the threshold is used as an indicator of the preamble end.

Advances in process technologies and low cost integration solutions over the past 5-6 years have made wireless communication practically feasible at frequencies of 60 GHz and above. This technical progress is reflected in wireless standards development such as IEEE 802.11ad, IEEE 802.15.3c, WirelessHD, ISO/IEC 1315n and others. The united specifications for 60 GHz wireless technology are referred to collectively as the WiGig standard. A distinctive feature of the new frequency range is a severe path loss: it exceeds the path loss in the conventional 5 GHz band by approximately 23 dB. Such environmental conditions make even more urgent the necessity of development of a receiving apparatus with a high degree of noise immunity. At the same time, the rates of data throughput in the above mentioned standards reached the range of 5-7 Gbps. Systems with such high data speed require wide band signal transmission and use of analog to digital converters with the sampling rates on the order of 10-20 GS/s.

Direct processing at sampling rates of 10-20 GS/s requires too much resources for implementation in practice. To overcome this difficulty, decimation is used in an RF demodulator of the wireless receiver, reducing the sampling rate of the signals to be processed and achieving a drop in the size of required resources by the factor of ten and more. In such a situation, the preamble detector described in the above referenced prior art patents may be used as before, however the position of the preamble end may be found with the accuracy only up to the decimated symbols period. The location of the preamble end inside of the period inevitably remains uncertain.

The goal of the present invention is a synchronization device for a wireless receiver that operates at a decimated symbols frequency, and performs not only preamble detection, but also symbols clock phase detection together with carrier phase detection, while enabling the theoretically possible noise immunity

BRIEF DESCRIPTION OF THE DRAWING

The foregoing and other objects, features and advantages will be apparent from the following more particular description of the embodiments, as illustrated in the accompanying drawings in which like reference characters refer to the same parts throughout the different views. The drawings are not necessarily to scale, emphasis instead being placed upon illustrating the principles of the embodiments

FIGS. 7a-7d show output signals of a time base unit of the system of FIG. 6.

DETAILED DESCRIPTION

Figure 1:
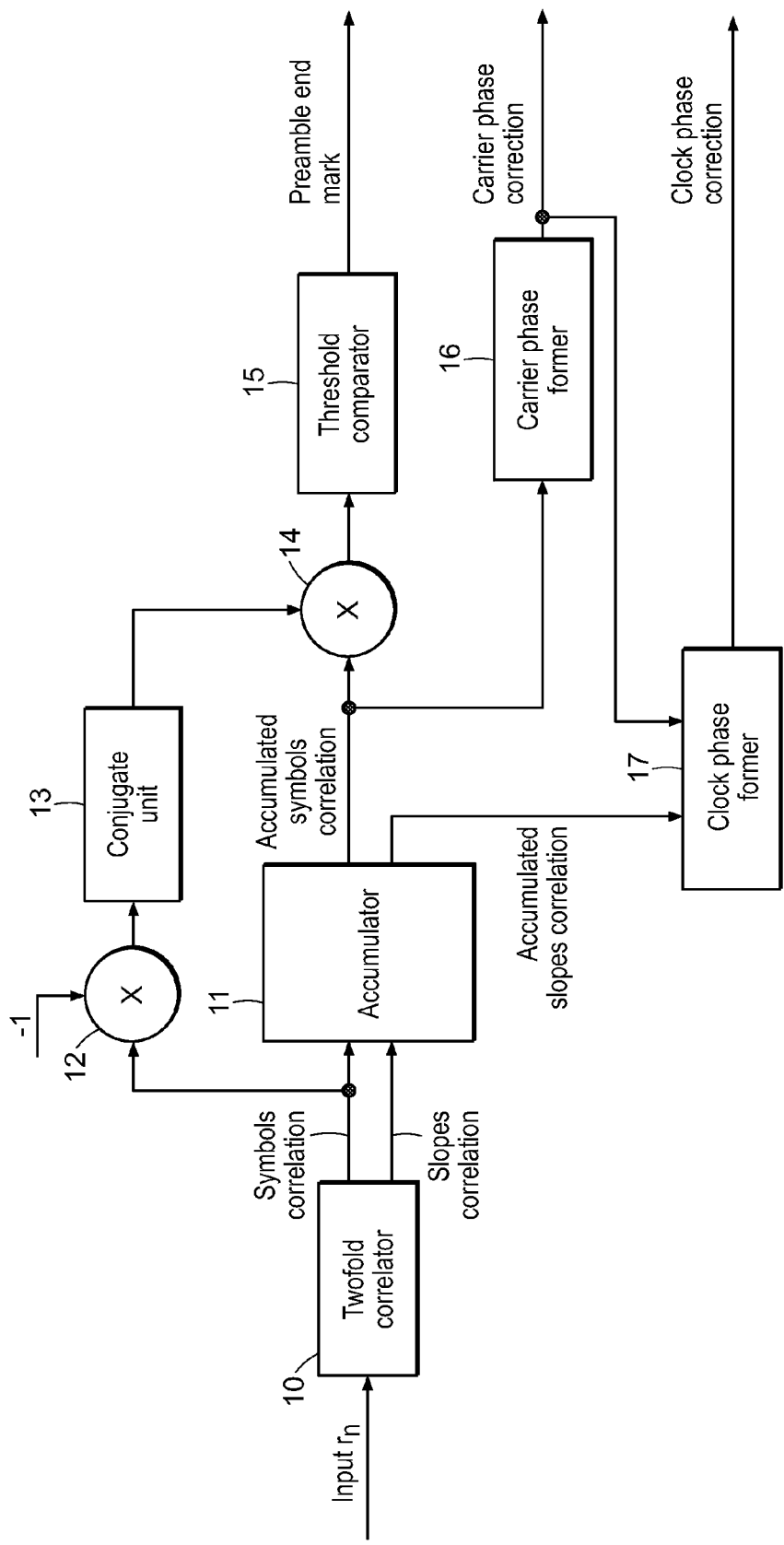
FIG. 1 shows in block diagram form, an exemplary embodiment of a synchronization system.

An exemplary synchronization device is described below for a wireless receiver built in accordance with the WiGig standard. However, it should be understood, that although various modifications and changes may be apparent to persons skilled in the art, these changes are to be included within the spirit and purview of this application and scope of appended claims and their full scope of equivalents.

In the WiGig standard a part of the main preamble destined for synchronization purposes (often called Short Training Field—STF) is specified as being composed of M=16 repetitions of a predetermined section, followed by a single repetition of the same section multiplied by −1. The section, having the length L=128 symbols, is specified as being a Golay sequence Ga128.

When the wireless receiver operates in a single carrier mode, a symbols stream in the payload part of the packet is separated in blocks of a fixed length. Each block is prepended by a small intermediate preamble (called also a "midamble") consisting of a Golay sequence Ga64 of the length Lm=64 symbols. The main preamble and the midambles alike are transmitted by π/2-BPSK modulation.

The preamble end detection is performed only for the main preamble. After the preamble end is found, a time base circuit is activated in the receiver. That circuit marks the positions of the intermediate preambles. However, the symbols clock phase detection and carrier phase detection is performed at all times: at the main preamble, to set up the phase of the local oscillators, and at the intermediate preambles, to sustain the synchronization.

To make the symbols clock phase detection possible, the synchronization system, according to the present invention, operates at the frequency that equals double the symbols frequency. As a consequence, the wireless receiver has a switched operation frequency: it operates at the nominal symbols frequency during data processing, and at a double the symbols frequency when processing a preamble or a midamble.

The transmitter, generating the preamble, produces L complex symbols R(k), where 0≤k<L, in each section. Because the preamble is processed in the receiver at a double symbols frequency, a received preamble section comprises 2L symbols r(n), where 0≤n<2L. The even positions in the preamble (n=2k) are filled with symbols R(k). The odd positions (n=2k+1) are filled with intermediate values that reside on ascending or descending branches of the inphase and quadrature components of the modulated signal. The directions of change for both components are specified by a set of complex slope coefficients S(k), where 0≤k<L, that are calculated according to the equation: S(k)=R*(k+1)−R*(k).

Since the preamble is transmitted by π/2-BPSK modulation, the symbols R(k) may have values ±1 or ±j. It is easy to verify that the slope coefficients S(k) have one of four possible values 1+j, 1−j, −1+j, or −1−j. If the real part of S(k) is positive, then the term r(2k+1) resides at the ascending slope of the inphase component; if it is negative, then the term r(2k+1) resides at the descending slope of the inphase component. At the same time if the imaginary part of S(k) is positive, then the term r(2k+1) resides at the ascending slope of the quadrature component; if it is negative, then the term r(2k+1) resides at the descending slope of the quadrature component.

An exemplary first embodiment of the synchronization system of the present invention provides an initial set up of the local oscillators phases in a wireless receiver. A block diagram of the first embodiment is shown in the FIG. 1. According to this diagram, complex symbols rn are applied to the input of the synchronization system from an RF demodulator (not shown). These symbols enter a twofold correlator 10. Twofold correlator 10 comprises a shift register of the length 2L, and a coefficients memory. The shift register stores the last received group of 2L symbols rn. The coefficients memory holds in storage two sets of coefficients: SymbolsCoefficients[n] and SlopesCoefficients[n], where 0≤n<2L. The usual combination of multiplications and additions produces at the outputs of the twofold correlator 10, two correlations: (1) symbols correlation as the convolution of the shift register contents with the coefficients set SymbolsCoefficients[n] and (2) slopes correlation as the convolution of the shift register contents with the coefficients set SlopesCoefficients[n]. An exemplary block diagram of the twofold correlator 10 is shown in the FIG. 2.

The coefficients set forming the SymbolsCoefficients[n] is determined from the preamble symbols R(k) according to the equations:

SymbolsCoefficients[2k]=R*(k),

SymbolsCoefficients[2k+1]=0. (1)

The coefficients set forming the SlopesCoefficients [n] is determined from the preamble symbols R(k) according to the equations:

SlopesCoefficients[2k]=0,

SlopesCoefficients[2k+1]=R*(k+1)−R*(k). (2)

The Symbols correlation and Slope correlation outputs of the twofold correlator 10 are connected to the inputs of an accumulator 11. The accumulator 11 adds together the last M values of the "Symbols correlation" signal and the "Slopes correlation" signal separated by intervals of 2L clocks. The addition is performed for each of the two inputs independently. The resulting two sums are brought out at the accumulator outputs as the "Accumulated symbols correlation" signal and the "Accumulated slopes correlation" signal. The accumulator 11 may be implemented, for example, as a cascade connection of M FIFOs, where each FIFO has a length 2L. Other solutions are possible as well.

The output "Accumulated symbols correlation" of the accumulator 11 is connected to an input of a multiplier 14. The other input of the multiplier 14 is connected to the symbols correlation output of the twofold correlator 10 through a series circuit, composed of a multiplier by −1 12 and conjugate unit 13. The output of the multiplier 14 produces a product of "Accumulated symbols correlation" and the conjugated symbols correlation, multiplied by −1. This product is applied to a threshold comparator 15, where it is compared with a predetermined threshold. If the product exceeds the threshold, then a pulse is formed at the output of the threshold comparator 15 to mark the found end of the preamble.

The "Accumulated symbols correlation" signal from the output of the accumulator 11 is applied also to the input of a carrier phase former 16. When the preamble appears at the receiver input and enters the synchronization system, the carrier phase former 16 produces a value at an output that equals the difference between the phase of carrier local oscillator and the phase of the incoming signal. At this instant, the pulse that marks the preamble end appears at the output of the threshold comparator 15 and passes to the carrier local oscillator, forcing a correspondent phase correction.

The clock phase former 17 receives as inputs signal "Accumulated slopes correlation" from the output of the accumulator 11 and the signal "Carrier phase correction" from the output of the carrier phase former 16. In the same manner as before, when the preamble appears at the receiver input and enters the synchronization device, the clock phase former 17 produces at it output a value that reflects the time shift between the symbols clock and incoming signal. At this instant the pulse that marks the preamble end appears at the output of the threshold comparator 15 and passes to the clock local oscillator forcing the necessary phase correction.

Preamble symbols R(k) which are produced in the transmitter, traverse through the channel and are reconstructed in the receiver RF demodulator. Before the synchronization is set up, there are two causes that affect the values of the reconstructed symbols. First, the presence of a difference φ between the phase of the local carrier oscillator and the phase of the incoming RF signal, changes each symbol R(k) into a product R(k)·exp(j·φ). Second, a time shift of the symbols clock produced in the receiver in relation to the incoming RF signal, shifts sampling instants in the RF demodulator from their ideal positions. As a result, a symbol value changes by a factor F, where 0.6<F<1.2. The joint action of the two mentioned causes, transforms the symbol value from R(k) into F·R(k)·exp(j·φ).

When one of the M first sections of the main preamble enters the twofold correlator 10, the signal symbols correlation at the twofold correlator first output equals:

$$\text{symbols correlation} = \sum_{k=0}^{2Ls} r(k) \cdot SymbolsCoefficients(k) = \sum_{k=0}^{Ls} r(2k) \cdot R*(k) = \quad (3)$$

-continued $$\sum_{k=0}^{Ls} F \cdot R(k) \cdot \exp(j \cdot \varphi) \cdot R*(k) = F \cdot \exp(j \cdot \varphi) \cdot \sum_{k=0}^{Ls} |R(k)|^2.$$

When all the M+1 sections of the main preamble enter the synchronization device, the twofold correlator 10 contains the last (negative) section of the preamble. The signal symbols correlation at the first output of the twofold correlator 10 at that time equals $$\text{symbols correlation} = -F \cdot \exp(j \cdot \varphi) \cdot \sum_{k=0}^{Ls} |R(k)|^2.$$

The accumulator 11 at that time contains all M first sections of the preamble. The "Accumulated symbols correlation" signal at its output equals:

$$\text{Accumulated symbols correlation} = M \cdot F \cdot \exp(j \cdot \varphi) \cdot \sum_{k=0}^{Ls} |R(k)|^2.$$

The output of multiplier 14 equals (having taken into consideration multiplication by −1 in multiplier 12 and conjugation in the conjugate unit 14):

$$\text{Accumulated symbols correlation} \cdot (-\text{symbols correlation})* =$$
$$M \cdot F^2 \cdot \left( \sum_{k=0}^{Ls} |R(k)|^2 \right)^2.$$

This value comes to the input of the threshold comparator 15.

As mentioned above, the preamble symbols R(k) equal ±1 or ±j. Therefore each of the squares |R(k)|² equals 1, the sum equals L and the output of multiplier 14 in the absence of noise equals M·F²·L². The threshold in the threshold comparator 15 is set usually to be equal to M·F²·L²/2. When the value at the input of the threshold comparator 15 exceeds this threshold, then a pulse that marks the end of preamble is produced at the output of this unit.

Figure 3A:
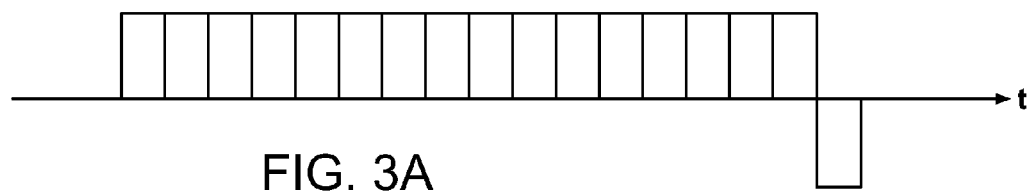
FIGS. 3a-3e diagrammatically illustrate exemplary operations that are involved in the creation of a pulse that marks the end of a preamble for the system of FIG. 1.
Figure 3B:
Figure 3C:
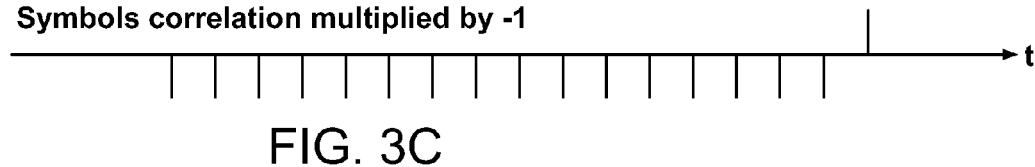
Figure 3D:
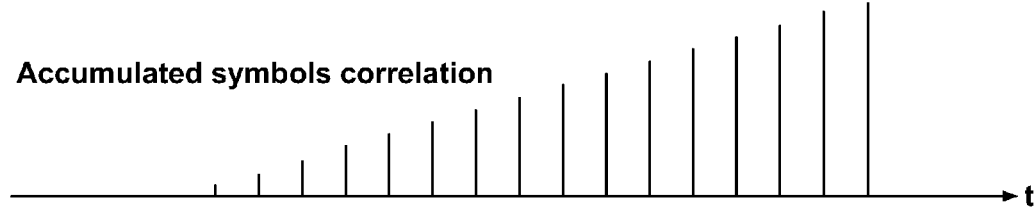
Figure 3E:
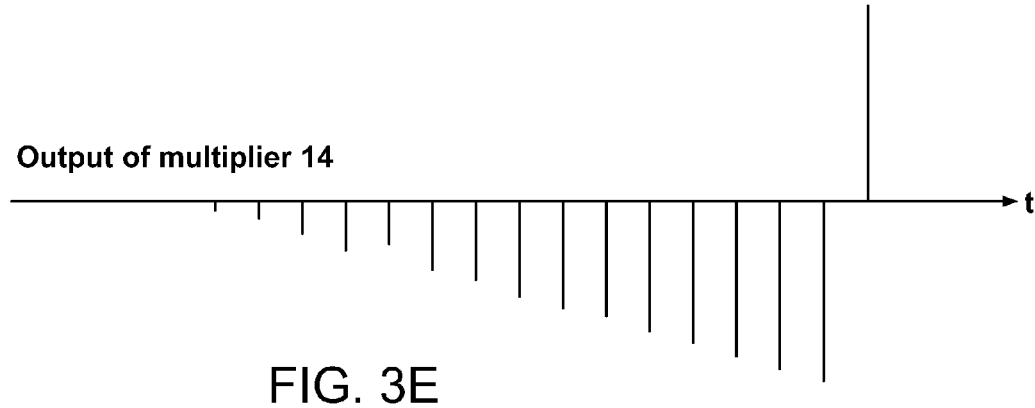

FIGS. 3a-3e diagrammatically illustrate the described operations that are involved in the creation of the pulse that marks the end of preamble. FIG. 3a shows the structure of the preamble: 16 repeating sections, followed by a section of the same kind but multiplied by −1. FIG. 3b exhibits signal at the symbols correlation output of the twofold correlator 10: a pulse is created at the end of each preamble section, with the pulse at the end of the last section being negative because that section is multiplied by −1. FIG. 3c shows the signal symbols correlation after multiplication by −1 in the multiplier 12. FIG. 3d shows the signal "Accumulated symbols correlation" at the output of accumulator 11: there are pulses at the ends of all preamble sections, but the amplitudes of the pulses increase from the preceding section to the succeeding one with the addition of the next pulse coming from the twofold correlator 10 (a delay for L clocks, that is present in the accumulator, is taken into consideration in this figure). FIG. 3e displays the signal at the output of the multiplier 14. If the last pulse in the shown sequence exceeds the predetermined threshold, it produces a mark of preamble end at the output of threshold comparator 15.

The "Accumulated symbols correlation" signal passes from the output of the accumulator 11 to the input of the carrier phase former 16 as well. As equation (3) shows, at the end of the preamble, this signal has a complex value and its phase φ equals the difference between the phase of the local carrier oscillator in the wireless receiver and the phase of the incoming RF signal. Hence, to determine the correction to be subtracted from the phase of the local carrier oscillator, the carrier phase former 16 determines the phase of the complex number at its input. That determination is done in the usual way: the imaginary part of the input number is divided by its real part and the carrier phase correction signal at the output of the carrier phase former 16 is found as an arc tangent of the quotient.

The clock phase former 17 receives at it two inputs, the "Accumulated slopes correlation" signal from the output of the accumulator 11 and the "Carrier phase correction" signal from the output of the carrier phase former 16. By processing these two inputs, the clock phase former 17 finds the time shift of the clock produced by the local symbols clock oscillator in the wireless receiver in relation to the incoming RF signal, and puts the found value at its output as a "Clock phase correction" signal.

Figure 4:
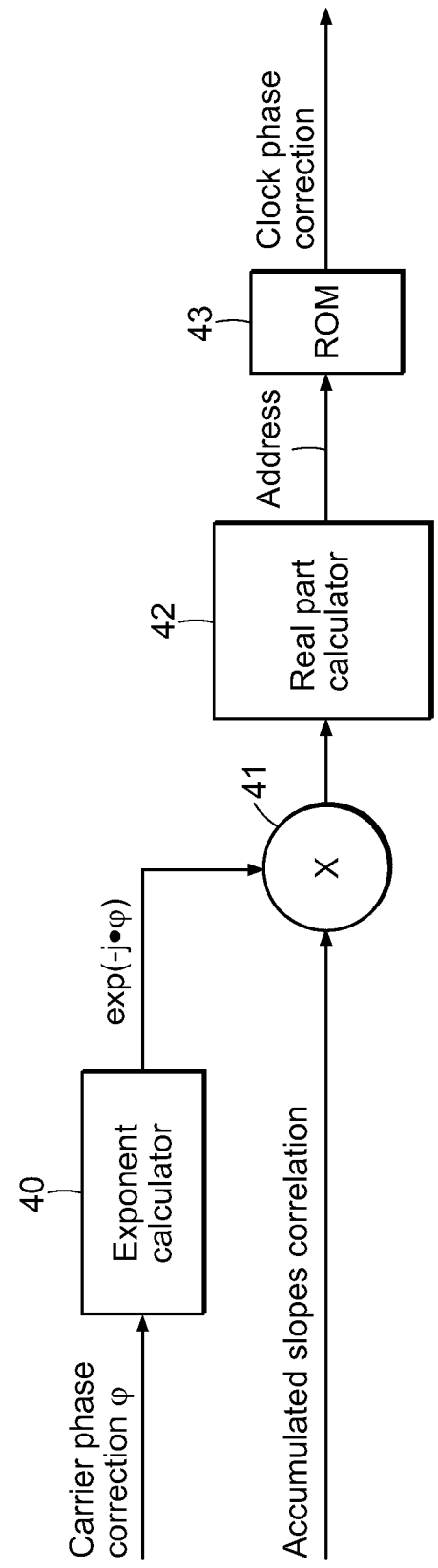
FIG. 4 shows in block diagram form, an exemplary clock phase former of the system of FIG. 1.

FIG. 4 shows a block diagram of the clock phase former 17. The diagram comprises an exponent former 40, a multiplier 41, a real part calculator 42 and a read only memory (ROM) 43. The clock phase former 17 receives from the output of the carrier phase former 16, the "Carrier phase correction" signal, i.e. a value that at the end of the preamble equals the found difference φ between the phase of the local carrier oscillator and the phase of the incoming RF signal. In the exponent calculator 40, this value is transformed into an exponent exp(−j·φ). The second input of the clock phase former 17 receives the "Accumulated slopes correlation" signal. This signal incorporates a factor exp(j·φ). The multiplier 41 multiplies the "Accumulated slopes correlation" signal by the exponent exp(−j·φ), eliminating by this action, said factor exp(j·φ). The output of the multiplier 41 is a complex number. The real part of this number is calculated in the real part calculator 42.

Figure 5:
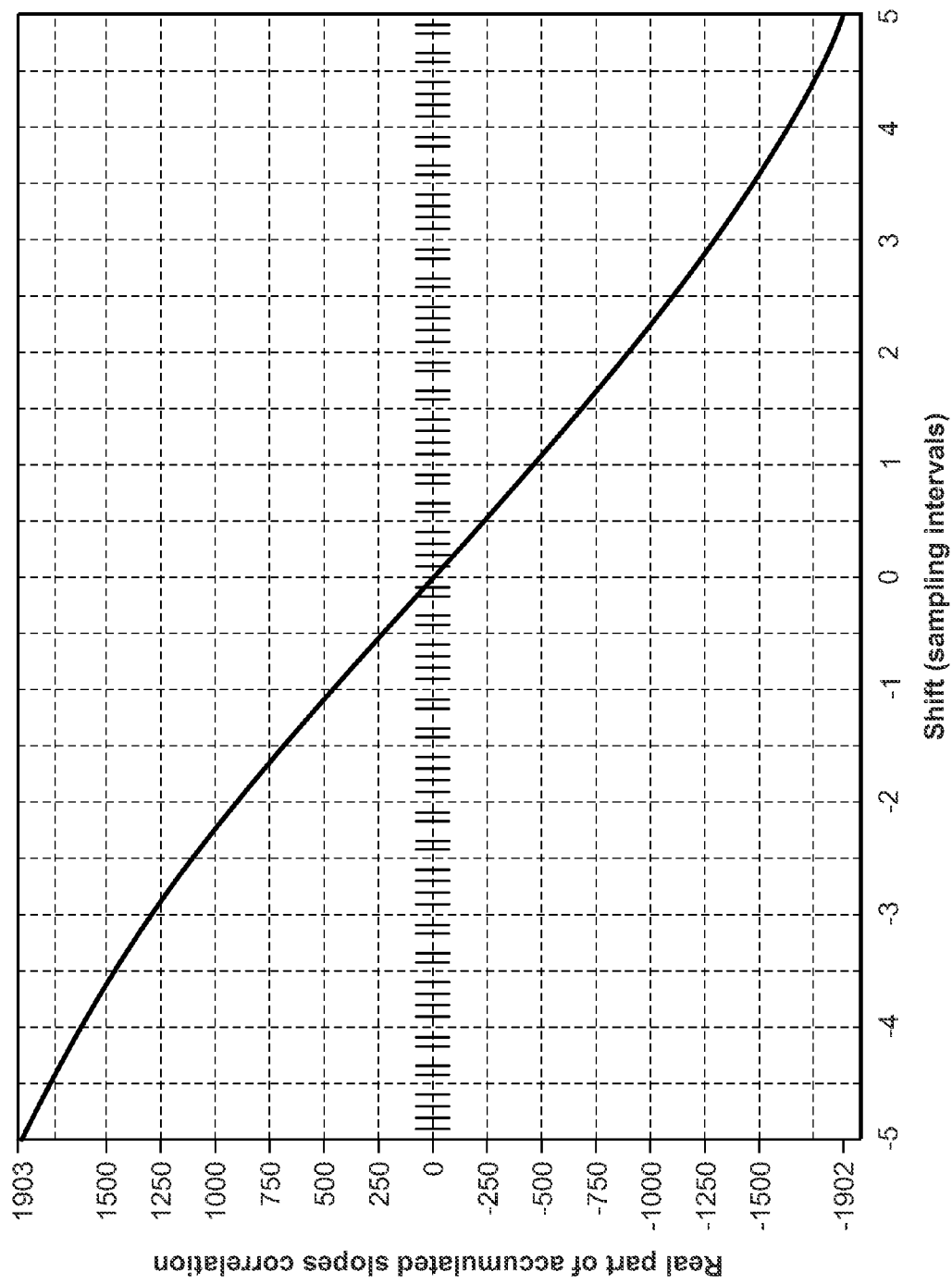
FIG. 5 shows the dependence of the real part of accumulated slopes correlation on the shift between the clock produced by the local clock oscillator in a wireless receiver and an incoming RF signal for the system of FIG. 1.

The operation of the clock phase former 17 is based on the dependence of the real part of the "Accumulated slopes correlation" signal upon the time shift between the clock produced by the local clock oscillator in the wireless receiver and the incoming RF signal. Such dependence was calculated and is shown in FIG. 5. The table that describes the inverse function (dependence of the time shift upon the real part of the "Accumulated slopes correlation" signal) is loaded into the ROM 43 of the clock phase former 17. The output of the real part former 42 is fed as an address into the ROM 43. The ROM 43 produces at its output the corresponding value of time shift, and this value is put on the output of clock phase former 17 as the "clock phase correction" signal. Calculation of the clock phase correction signal eliminates the uncertainty of the symbols reproduction instants that arises from the decimation in the RF demodulator of the wireless receiver.

The first embodiment of the present invention that has been described above, performs an initial set up of the local oscillators phases in the wireless receiver. A second embodiment of the invention performs initial set up and, in addition, sustains correct phases of the local oscillators during all the time of data processing. A block diagram of the second embodiment is shown in the FIG. 6. As compared with the FIG. 1, this diagram comprises a new unit—a time base unit 62. Furthermore, an output Frq control is added to the system and the operation of the twofold correlator and the accumulator is made controllable by the time base unit 62. All the other parts of the diagram of FIG. 6 remain unchanged with the same numbering.

The time base unit 62 has an input connected to the output of the threshold comparator 15 and three outputs: a frequency control output that is used as "Frq control" output of the synchronization system, a mode control output and a midamble end output.

When the wireless receiver is originally switched on, the time base unit 62 is brought into a "Main preamble search" mode. Each time when the synchronization system detects a main preamble, the threshold comparator 15 produces a pulse at its output. This pulse passes to the input of the time base unit 62 and switches it into a "Midambles processing" mode. In this mode, among other things, an inner counter in the time base unit 62, keeps track of the elapsed time. When the counter shows that a determination of packet end is achieved, the time base unit 62 returns into the "Main preamble search" mode.

The signal at the mode control output reflects the mode of the time base unit 62. This output is connected to the control inputs of the controlled twofold correlator 60 and the controlled accumulator 61, thereby determining the operation of these units. The frequency control output of the time base unit 62 carries a two level signal. One level marks time intervals, where the main preamble is searched or midambles are processed. The other level marks time intervals, where payload data are processed. This signal determines the frequency of the symbols clock local oscillator: a doubled nominal frequency in the first case and a nominal frequency in the second. At the end of each time interval, allocated for midamble processing, the time base unit 62 generates a pulse at the midamble end output. This pulse passes to an input of the gate OR 63. The other input of the gate OR 63 is connected to the output of threshold comparator 15 and receives from it, a pulse that marks the end of the main preamble. Pulses that appear at the output of the gate OR 63 are transferred to the local oscillators of the wireless receiver. Those pulses are indicative of the time instants when the correction signals that are produced by the synchronization device should be applied to local oscillators phases adjustment. Exemplary output signals of the time base unit 62 are shown in FIG. 7.

Figure 2:
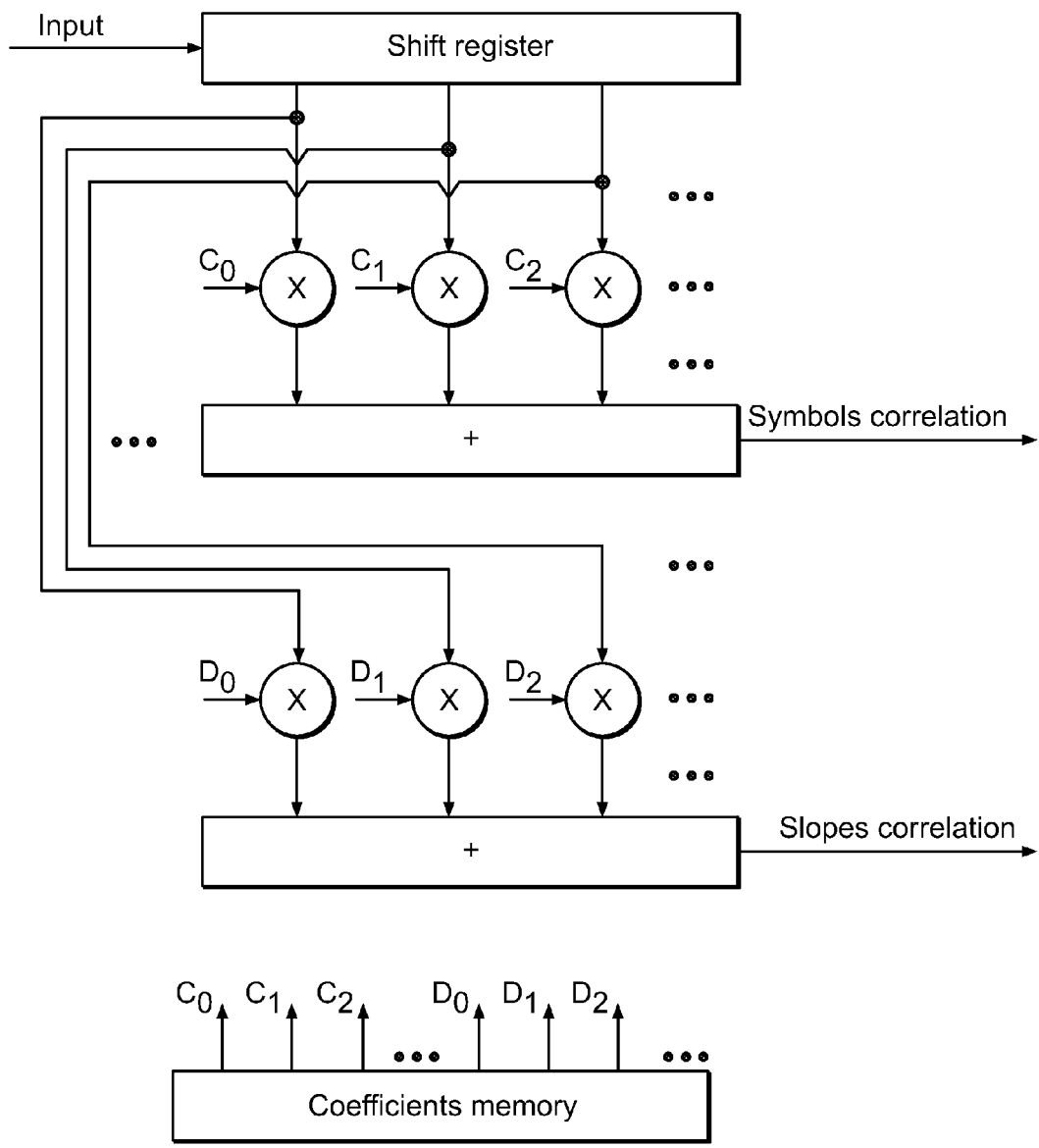
FIG. 2 shows in block diagram form, an exemplary twofold correlator of the system of FIG. 1

The operation of the controlled twofold correlator 60 is basically the same as the operation of the twofold correlator 10 in FIG. 1, but the pair of coefficients sets SymbolsCoefficients[n] and SlopesCoefficients[n] used in the calculations of the output signals is varied in accordance with a value received at the control input of the controlled twofold correlator 60 from the time base unit 62. If the signal at the control input shows that synchronization device is in the "Main preamble search" mode, then the coefficients sets are determined by equations (1) and (2). If the signal at the control input shows that synchronization device is in the "Midambles processing" mode, then the coefficients sets are determined by equations:

$$SymbolsCoefficients[2k]=Rm^*(k),$$

$$SymbolsCoefficients[2k+1]=0.$$

$$SlopesCoefficients[2k]=0,$$

$$SlopesCoefficients[2k+1]=Rm(k+1)-Rm(k),$$

where index k runs through the range $0 \leq k < Lm$, Lm is the length of the midamble and the Rm (k) are midamble symbols.

The operation of the controlled accumulator 61 also depends on the signal that comes to it control input from the time base unit 62. If the signal at the control input shows that synchronization device is in the "Main preamble search" mode, then the controlled accumulator 61 operates just in the same way as accumulator 11 in the block diagram of the FIG. 1. When the mode is changed to "Midambles processing", then the two inputs of the controlled accumulator 61 are connected straight to its outputs, and the accumulator is eliminated from the synchronization system.

Figure 6:
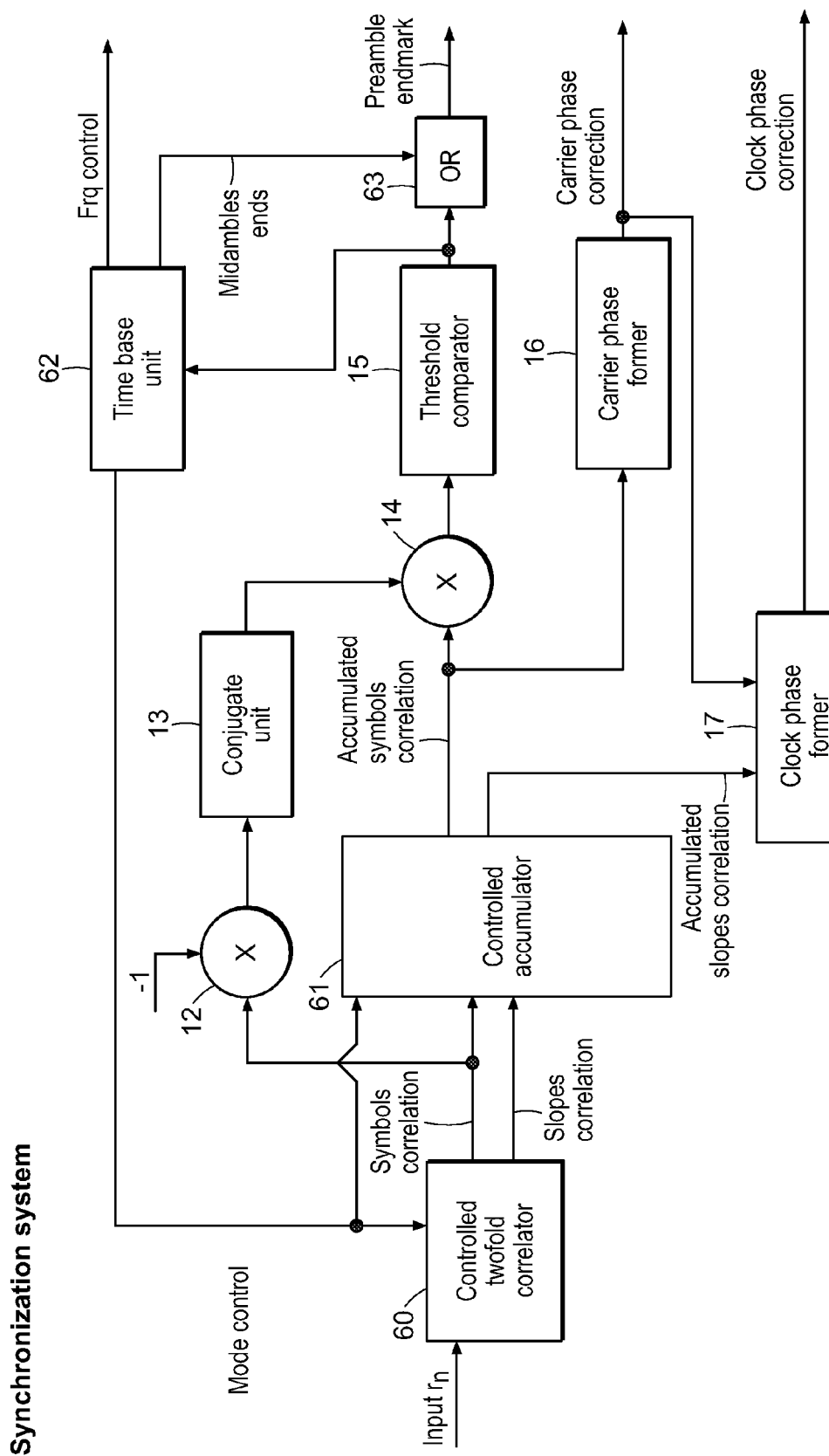
FIG. 6 shows in block diagram form, a second exemplary embodiment of a synchronization system.

It is easy to see from the presented description of the operation of the block diagram shown in the FIG. 6, that the second embodiment of this invention in addition to the functions performed by the first embodiment (a) maintains doubling of the symbols frequency during midambles processing, (b) produces pulses that mark ends of the midambles and (c) forms carrier phase correction together with clock phase correction signals that are necessary for local oscillators phases adjustment—in other words it does everything that is needed to sustain synchronization after the main preamble was found and used.

As opposed to the prior art US patents cited above, the system according to the present invention operates at the double symbols frequency and contains a twofold correlator that creates, in addition to symbols correlation, the slopes correlation as well. The slopes correlation brings out information about intermediate values of the received preamble, where those values lie at the slopes of inphase and quadrature components that run from one symbol to another. The indicated changes enable determination of the necessary symbols clock phase correction in the clock phase former 17. There are also elimination of the absolute-value-generating unit before the accumulator and producing the final pulse, delivered to the input of the threshold comparator, not as a combination of the correlator and accumulator outputs, but as their product. These latter changes bring the performance of the synchronization device closer to one of the optimum receiver elevating first of all it noise immunity. Testing of a wireless receiver which has a synchronization system in accordance with the present invention shows that, even when the noise level exceeded the RF signal level by 20 dB, synchronization continued to function without a failure.

One skilled in the art will realize the invention maybe embodied in other specific forms without departing from the spirit or essential characteristics thereof. The foregoing embodiments are therefore to be considered in all respects illustrative rather than limiting of the invention described therein. The scope of the invention is thus indicated by the appended claims, rather than by the foregoing description, and all changes that come within the meaning and range of equivalency of the claims are therefore intended to be embraced therein.

What is claimed is:

1. A synchronization system for initial setup—and continuous sustenance of local oscillators phases in a wireless receiver of a communication system, wherein the communication system is characterized by transmission of data packets having a predetermined preamble consisting of M identical sections of L symbols followed by a single section of the same kind, multiplied by −1, and wherein the wireless receiver is operative to perform decimation in an RF demodulator, comprising:

A. a state-controlled twofold correlator characterized by selective operation in a preamble processing state or a midamble processing state, and having a symbol input for receiving a stream of complex input symbols from the RF demodulator, a correlator state control input, a symbols correlation output, and a slopes correlation output, and operative in the preamble processing state when the received stream of symbols is representative of a preamble or in the midamble processing state when the received stream of symbols is representative of a midamble depending on a value of state signal at the twofold correlator state control input, and including a coefficients memory for storing and making available a SymbolsCoefficients[k] coefficients set and SlopesCoefficients[k] coefficients set, wherein 0≤k<L, wherein when operating in the preamble processing state, L equals a value corresponding to the number of symbols in a main preamble section, and wherein when operating in the midamble processing state, L equals a value corresponding to the number of symbols in a midamble section, wherein said twofold correlator is responsive to the state signal applied to the twofold correlator state control input to be:

i. operative to perform a convolution of the last L input symbols of a preamble, if in the preamble processing state, or the midamble if in the midamble processing state, of the input stream with the available coefficients of the SymbolsCoefficients[k] coefficient set, and apply results of the convolution to the symbols correlation output, and ii. operative to perform a convolution of the last L input symbols of the preamble, if in the preamble processing state, or the midamble if in the midamble processing state, of the received input stream with the coefficients of the SlopesCoefficients[k] coefficient set, and apply results of the convolution to the slopes correlation output.

2. The synchronization system according to claim 1, further comprising:

B. a state-controlled accumulator characterized by selective operation in a preamble processing state—or a midamble processing state, and having a symbols correlation input coupled to the symbols correlation output of the twofold correlator, a slopes correlation input coupled to the slopes correlation output of the twofold correlator, an accumulator state control input, an accumulated symbols correlation output and an accumulated slopes correlation output, and operative in the preamble processing state when the received stream of symbols is representative of a preamble or in the midamble processing state when the received stream of symbols is representative of a midamble depending on the value of state signal at the accumulator state control input, and wherein said accumulator is responsive to the signal applied to the accumulator state control input to:

when in the preamble processing state:

i. add together last M values of the input signals at the symbols correlation input thereof, wherein the added values are separated by intervals of L clocks, and apply the resultant sum to the accumulated symbols correlation output, ii. to add together last M values of the input signals at the slopes correlation input thereof wherein the added values are separated by intervals of L clocks, and apply the resultant sum to the accumulated slopes correlation output, wherein steps i and ii are performed independently, and when in the midamble processing state:

iii. directly connecting the input signals at the symbols correlation input to the accumulated symbols correlation output, and iv. directly connecting the input signals at the slopes correlation input to the accumulated slopes correlation output.

3. The synchronization system according to claim 2, further comprising:

C. a multiplier having a first multiplier input coupled to the accumulated symbols correlation output of the state-controlled accumulator, and a second multiplier input coupled to the symbols correlation output of the state-controlled twofold correlator through a series circuit operative multiply the signal from the symbols correlation output of the state-controlled twofold correlator by −1 and perform a conjugate transform thereon and apply a resultant multiplier signal to a multiplier output.

4. The synchronization system according to claim 3, further comprising:

D. a threshold comparator having a threshold input coupled to the multiplier output and a threshold output, wherein the threshold comparator is operative to produce a pulse at the threshold output when the resultant multiplier signal exceeds a predetermined threshold, E. a carrier phase former having a carrier phase input coupled to the accumulated symbols correlation output of the state-controlled accumulator, and a carrier phase correction output, wherein an accumulated symbols correlation signal is a complex value having a real part and an imaginary part, and wherein the carrier phase former is operative to generate a carrier phase correction signal and apply the carrier phase correction signal to the carrier phase correction output, wherein the carrier phase correction signal corresponds to the arctangent of a ratio of the real part of the accumulated symbols correlation signal to the imaginary part of the accumulated symbols correlation signal, and F. a clock phase former having a first clock phase input coupled to the accumulated slopes correlation output of the state-controlled accumulator, a second clock phase input coupled to the carrier phase correction output, and a clock phase correction output, wherein the clock phase former is operative to generate a clock phase correction signal and apply the clock phase correction signal to the clock phase correction output, and G. a time base unit having a time base input connected to the threshold output of the threshold comparator, a state control output connected to the state-control input of the state-controlled twofold correlator and the accumulator state control input of the state-controlled accumulator, a frequency control output, and a midambles ends output, wherein the time base unit comprises a counter adapted to reset in response to a pulse applied to the time base input and operative to determine the end of a current packet and the time intervals where midambles appear in the input signal, wherein the outputs of the time base unit are formed based on the state of said counter in such a way that i. the signal at the state control input is indicative of preamble processing state from the instant of initial switching on or the end of the previous packet till the detected preamble end and is indicative of midambles processing state all the other time, ii. the signal at the frequency control output is indicative of double clock frequency from the instant of initial switching on or the end of the previous packet till the detected preamble end and during time intervals where midambles appear in the input signal, being indicative of a nominal clock frequency all the other time, the signal at the midambles ends output is indicative of termination points of the time intervals where midambles appear in the input signal, and H. an OR gate having a first OR input, a second OR inputs and an OR output, wherein:
 i. the first OR input is connected to the output of the threshold comparator,
 ii. the second OR input is connected to the midambles ends output of the time base unit,
  wherein the OR output provides a preamble end mark output of the synchronization system.

5. The synchronization system according to the claim 1, wherein when the value at the control input of the controlled twofold correlator is indicative of operation in the preamble processing state, the coefficients set SymbolsCoefficients[k] is determined from a sequence of a main preamble symbols R[k] by equations:

SymbolsCoefficients[$2k$]=$R^*[k]$;

SymbolsCoefficients[$2k+1$]=0, and when the value at the control input of the controlled twofold correlator is indicative of operation in the midamble processing state, the coefficients set SymbolsCoefficients[k] is determined from a sequence of the midamble symbols Rm [k] by equations:

SymbolsCoefficients[$2k$]=$Rm^*[k]$;

SymbolsCoefficients[$2k+1$]=0.

6. The synchronization-system according to the claim 1, wherein if the value at the control input of the controlled twofold correlator is indicative of operation in the preamble processing state, then the coefficients set SlopesCoefficients [k] is determined from a sequence of a main preamble symbols R[k] by equations:

SlopesCoefficients[$2k$]=0,

SlopesCoefficients[$2k+1$]=$R^*(k+1)-R^*(k)$, whereas if the value at the control input of the controlled twofold correlator is indicative of operation in the midambles processing state, then the coefficients set SlopesCoefficients [k] is determined from a sequence of the midamble symbols RM[k] by equations:

SlopesCoefficients[$2k$]=0,

SlopesCoefficients[2k+1]=$Rm^*(k+1)-Rm^*(k)$.

* * * * *